United States Patent [19]

Strow et al.

[11] 4,443,126
[45] Apr. 17, 1984

[54] WATER SCREENING CLAMP STRIP

[75] Inventors: Donald A. Strow, Hales Corners; Harold I. G. Henning, New Berlin, both of Wis.

[73] Assignee: Envirex Inc., Waukesha, Wis.

[21] Appl. No.: 277,304

[22] Filed: Jun. 25, 1981

Related U.S. Application Data

[63] Continuation of Ser. No. 95,850, Nov. 19, 1979, abandoned.

[51] Int. Cl.³ .................................................. F16D 1/00
[52] U.S. Cl. ...................................... 403/24; 403/408; 160/403
[58] Field of Search ............... 411/531, 544; 160/398, 160/399, 402, 403; 403/408, 24

[56] References Cited

U.S. PATENT DOCUMENTS

| 291,202 | 1/1884 | Koch | 411/531 X |
|---|---|---|---|
| 1,032,839 | 7/1912 | Kemler | 160/380 X |
| 1,411,908 | 4/1922 | Cacici | 160/380 X |
| 1,895,309 | 1/1933 | Boomershine | 160/402 X |
| 2,116,690 | 5/1938 | Woodings | 411/544 |
| 2,314,026 | 3/1943 | Willett | 160/398 X |
| 3,696,857 | 10/1972 | Le Tarte | 160/403 X |

Primary Examiner—Andrew V. Kundrat
Attorney, Agent, or Firm—John M. Neary; Vance A. Smith

[57] ABSTRACT

A clamp strip is bolted to a frame member which may be one side or rail of the basket of a travelling water screen. The strip clamps a margin of the screening to the frame. The strip is of a durable non-metallic material of a high modulus of elasticity and of a general rectangular section. The strip initially is of an arcuate form so that the deformation effected by bolting exerts a force against an extended area of the screening to hold the latter securely. Each strip of one form is secured by a single central bolt. Each strip of another form is secured by two or more bolts including a bolt at each end of the strip.

4 Claims, 7 Drawing Figures

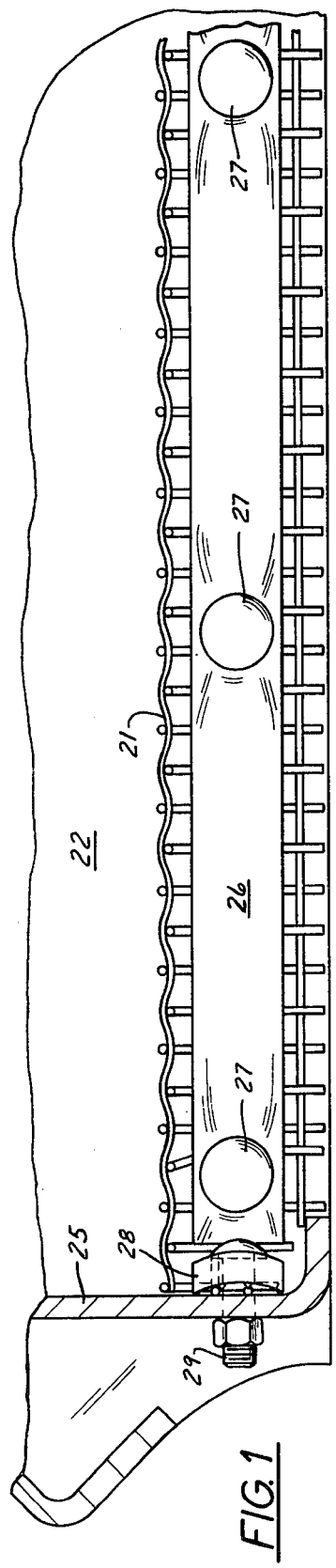
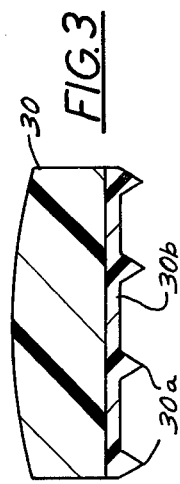
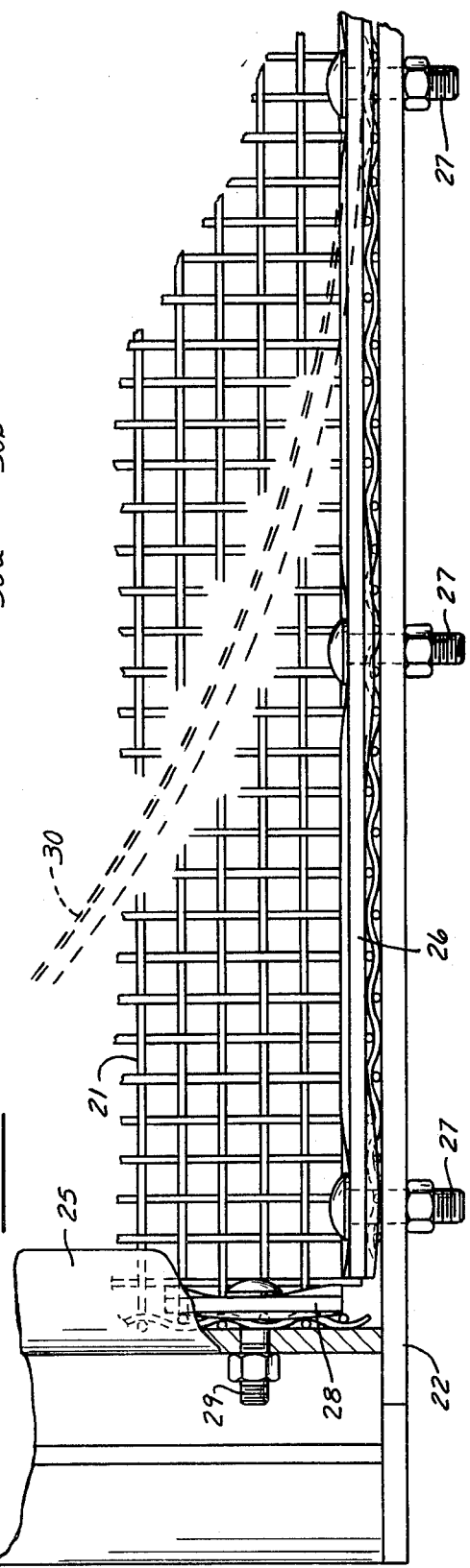

WATER SCREENING CLAMP STRIP

This is a continuation, of application Ser. No. 095,850, filed Nov. 19, 1979 and now abandoned.

BACKGROUND OF THE INVENTION

U.S. Pat. No. 2,286,332 shows the lower underwater end of a travelling water screen which includes an endless series of baskets carried by parallel chains. Each basket comprises a rectangular frame which is carried at each end by a link of one of the chains. The screening 21 is generally a rectangular panel of woven wire screening having its margins bent 90° to fit against the inner faces of the frame members. The frame members include the end plates 22 and transverse members 24 and 25. In other constructions the margins of the screening are not bent 90°. That is, each basket has four flat surfaces in one plane and against which the margins of the flat screen panel are secured. In both cases, however, and as shown in FIG. 2 of U.S. Pat. No. 2,286,332, rigid clamping bar overlies each margin and bolts extending through aligned holes of the bar and frame member are tightened to clamp the screening margins therebetween and secure the screening to the frame. All the mentioned parts must be of stainless steel or other corrosion resistant material. The parts which may be painted may alternatively be of carbon steel and of less cost.

An object of the invention is to provide clamping strips of a material of less cost than stainless steel or the like and which does not require painting and which will more adequately secure the screening to the basket frame members.

SUMMARY OF THE INVENTION

The clamping bars for securing the screening to the basket frames of a travelling water screen comprise strips of a rigid polyvinyl chloride compound or other durable engineered plastic. The strips are secured to the basket frames by bolts extending therethrough and are initially arcuate with respect to the bolt holes provided for the bolts. When installed, the strips are straight and strained so that the entire screening under the strips is pressed against the basket frame. This effect compensates for the fact that the strips are less rigid than comparable bars of carbon steel or steel alloys. The face of the strip which engages the screening may be indented or concave so that the wires of the screening bolt are more fully engaged by the strip and the screening is securely held laterally by the strip. The strips provide a securement of the screening which is an improvement over that provided by the metal bars and in addition are non-corrosive and of less cost.

DESCRIPTION OF THE DRAWING FIGURES

FIG. 1 shows a section of the screening and as secured to the adjoining portions of two frame members.

FIG. 2 shows a section of the screening in plan and the adjoining margins of the screening and frame members to which the screening is secured. The arcuate form of one clamping strip as molded is shown by broken lines.

FIG. 3 is an enlarged cross section of a preferred strip produced by a dual-extrusion process which includes a rigid body and a more flexible polyvinyl chloride compound facing.

Figure 4:
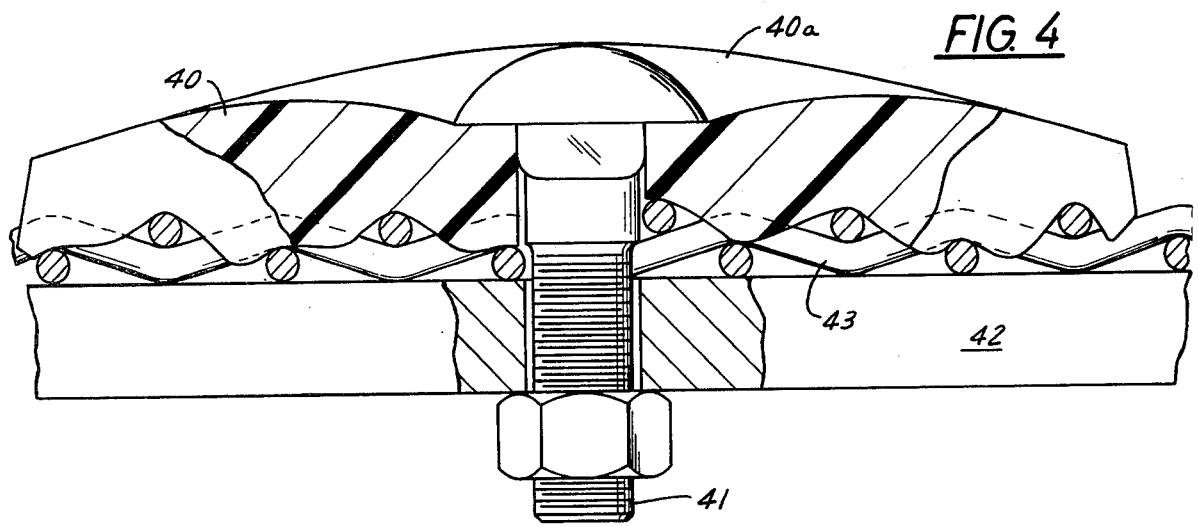

FIG. 4 is a side view of an alternate clamping strip. Each strip is secured by a single bolt and several such strips are used to secure each margin of the screening. A portion of the strip shown is broken away and sectioned.

Figure 5:
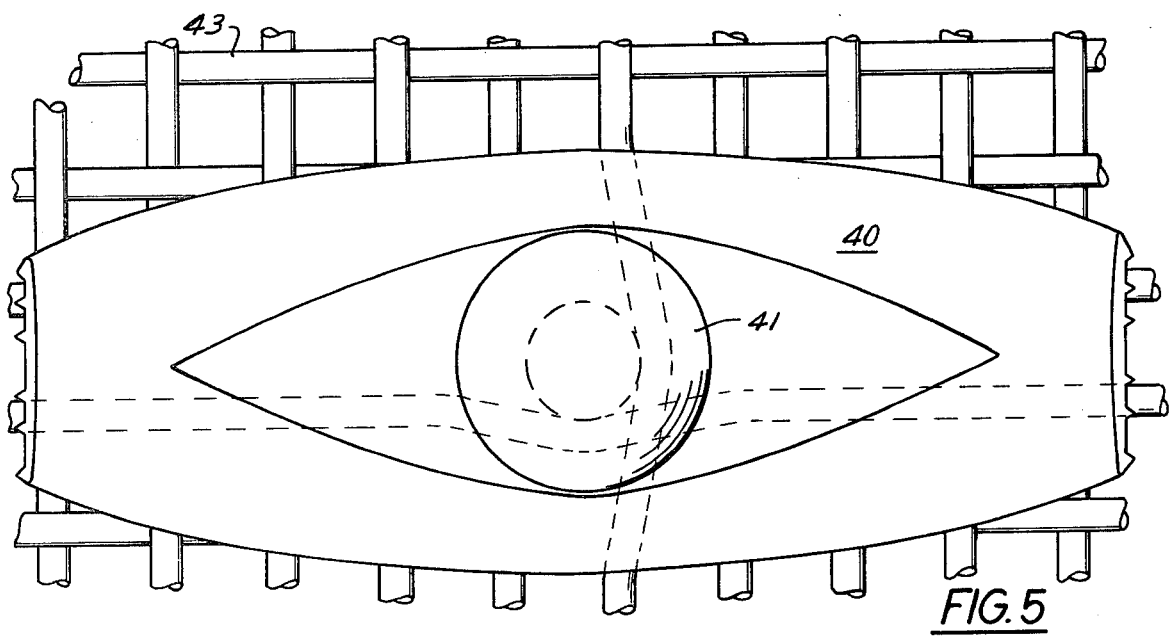

FIG. 5 is a plan view of the strip and of the screening shown in FIG. 3.

Figures 6, 7:
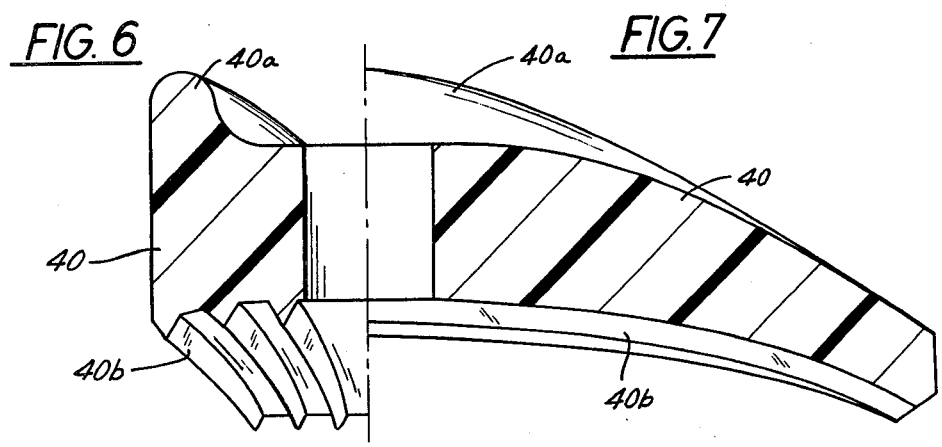

FIGS. 6 and 7 are median sections of the clamping strip of FIGS. 3 and 4 as molded.

DESCRIPTION OF THE PREFERRED EMBODIMENTS

The screen basket shown in part in FIGS. 1 and 2 includes the screening 21, an end plate 22 and the transverse member 25. The clamping strip formed of an elongated thermoplastic element 26 is fixed by bolts 27 to end plate 22 with a margin of screening 21 secured therebetween. The strip 28 is fixed by bolts 29 to member 25 with the adjoining margin of screening 21 similarly secured therebetween. The frame which includes two end plates, the member 25 and a corresponding transverse member, not shown, are preferably of stainless steel but are more commonly of carbon steel and galvanized or painted. Round holes for the bolts are punched to have a selected spacing.

The bolts 27, 29 are carriage bolts and have a smooth rounded head and an adjacent square shank portion. Depending upon the requirements and corrosive conditions of service, the bolts are preferably of stainless steel, but may be of a copper alloy or of carbon steel protected by cadmium or zinc plating.

The screening 21 is generally of a woven wire construction. Copper alloy wire of twelve gauge of strength and a three-eights inch (9.52 mm) mesh would be typical. Generally, the wire is bent with a drift to provide the larger openings required for the bolts. Other types of screening including molded plastic sheets are available.

The clamping strips 26, 28 are cut to length as required from the extruded stock. The holes for the bolts are square and are punched to match the holes of the basket frame.

The cross section of a molded strip 30 is shown in FIG. 3 (enlarged). Dimensions of ½ inch by 1 inch (11.2 mm by 25.4 mm) would be typical.

Several thermoplastic materials of adequate rigidity and chemical stability are available. The proprietary (Goodrich) polyvinyl compound sold as Geon 85781 would be suitable and represents two compromises which the present invention accomplishes. The first is that the clamping strips 26, 28 must be and remain adequately rigid throughout their service life in and out of water. On the other hand, the material is soft to the extent that the force exerted by the bolts when tightened, does cause the wire of the screening to be pressed partially into the lower face of the strips with the result that the screening is firmly secured against pulling out, particularly by the wires which are parallel with the strips and are anchored therein. This anchoring is fully effective, of course, adjacent to each bolt and diminishes as to the wires under the portions of the strips more remote from the bolts. The effective anchoring is extended by each of three expedients. As shown in broken lines in FIG. 2, the strip 30 is extruded in an arc and is stored in coils from which the individual strips 26, 28 are cut. Each strip length is then laid against the screening so that each portion between bolts is strained to press against the screening. As shown in FIG. 3, the bottom of the strip which is to engage the screening may be provided with the several lengthwise ribs 30a.

Such ribs may provide an improved anchoring such as has been described, and as is further shown in an alternate embodiment as will be described.

A dual extrusion allows the strip to be molded of two different materials such that the lower thin layer 30b of strip 30 may be of a slightly less rigid material and which will be readily pressed into the screening by the rigid material of the strip. The material of layer 30b may be Geon 8814, for example.

A clamping strip to secure the margin of a screen panel to a frame member may also comprise a series of shorter elements, each of which is fixed by a single bolt to the frame member. An element 40 of such a clamping strip is shown in FIGS. 4–7 and is individually injection molded of a material such as of Geon 85796.

The element 40 is molded with a square hole for the bolt 41 which extends through the element and the frame member 42 to secure the screening 43 therebetween. As shown in FIGS. 6 and 7, the element is arcuate both laterally and lengthwise. The upper lengthwise ribs 40a particularly compensate for the weakening effect of the hole which is required for the bolt and the general outline of the element is rounded so that strings, rags and the like will not be caught and carried along by the basket.

The bottom face of element 40 is provided with the lengthwise ribs 40b. Their optimum size and number may be determined by the type of screening to be secured, and may not be required with larger wires and coarse screening.

As shown in FIG. 4, the effect of the arcuate form of element 40 should be such that the entire bottom face of the element is well pressed into the screen openings and around the wires. Such anchoring of the screening may be equal to and preferred over the strips shown in FIGS. 1–3. In both embodiments, however, the arcuate initial form of the strips extends the anchoring effect to equal or better than that provided by the prior art steel clamping bars which only frictionally secure the flat screening against pulling out from between the bars and the frame members.

We claim:

1. A clamping strip for bolting to a straight frame member of a traveling water screen and securing therebetween a margin of a heavy gauge woven wire screening to be carried by the frame, comprising an elongated element of a durable, non-corrosive relatively less rigid thermoplastic material than the screen, the strip element being generally rectangular in cross-section and having a bolt, the strip element having a screen engaging face that is arcuately formed to present longitudinal outer edges to the screen proportioned such that the strip is strained by bolt tension and deforms the outer edges of said element into the intersticies between the wires of the screening to interlock the screening with the strip and to firmly secure the screening to the frame.

2. A clamping strip for securing the margin of a piece of screening to a rigid frame member, comprising: (a) an elongated element of a rigid material than the screen, and (b) a centrally located bolt projecting from one face of the element, and having a head which seats against the element, said face of the element being arcuately formed to provide edges along its length proportioned such that, when the bolt is tightened against the frame member, the element is firmly deformed into the intersticies of the screening along its length for interlocking with the screening.

3. A frame for supporting a rectangular pice of woven wire screening comprising a plurality of frame members and clamping means including bolts for securing a screening margin to the frame members by gripping said margin of the screening between the clamping means and the frame member, said means comprising an elongated element formed of a durable, non-corrosive relatively less rigid thermoplastic than the screen, the cross-section of said elongated element being generally rectangular and having a concave face to engage the screening such that bolt tension deforms the adjacent longitudinal marginal portions of the element into the intersticies between the wires of the screening to interlock the screening with the element and firmly secure the screening to the frame member.

4. In a traveling water screen, the combination of a frame formed of a plurality of frame members, and a piece of woven wire screening secured to and supported by the frame, wherein the improvement comprises: a plurality of clamping strips and bolts securing the strips to the frame members and securing a margin of the screening therebetween, each said strip comprising an elongated element of a durable, non-corrosive relatively less rigid thermoplastic than the screen, said elongated element havings one arcuately concaved face engaging the screening such that bolt tension deforms the adjacent marginal portions of the element over the wires of the screening and provides their interlocking with the screening and the firm securement of the screening to the frame member.

* * * * *